United States Patent
Nasir et al.

(10) Patent No.: US 10,878,432 B2
(45) Date of Patent: Dec. 29, 2020

(54) SYSTEM AND METHODS FOR CONSUMER MANAGED BEHAVIORAL DATA

(71) Applicant: Verizon Patent and Licensing Inc., Arlington, VA (US)

(72) Inventors: Azim Nasir, Foxboro, MA (US); Andre R. Turner, Belmont, MA (US); Sanjay Kenchegowda, Littleton, MA (US); Dongchen Wang, Concord, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1063 days.

(21) Appl. No.: 14/727,566

(22) Filed: Jun. 1, 2015

(65) Prior Publication Data

US 2016/0117692 A1 Apr. 28, 2016

Related U.S. Application Data

(60) Provisional application No. 62/069,075, filed on Oct. 27, 2014.

(51) Int. Cl.
*G06Q 30/02* (2012.01)
*H04L 12/28* (2006.01)
(Continued)

(52) U.S. Cl.
CPC ..... *G06Q 30/0201* (2013.01); *H04L 12/2801* (2013.01); *H04L 43/06* (2013.01);
(Continued)

(58) Field of Classification Search
None
See application file for complete search history.

(56) References Cited

U.S. PATENT DOCUMENTS 7,428,585 B1 * 9/2008 Owens, II ........... G06F 21/6218
709/223
7,640,336 B1 * 12/2009 Lu ........................ G06Q 10/10
709/206

(Continued)

FOREIGN PATENT DOCUMENTS

WO WO-2005054973 A2 * 6/2005 ........... E21B 47/024

OTHER PUBLICATIONS

Ohm, Paul. "The Rise and Fall of Invasive ISP Surveillance" [2009] 2009:5 University of Illinois Law Review, 1417. (Year: 2009).*

*Primary Examiner* — Susanna M. Diaz

(57) ABSTRACT

A method may permit a consumer to manage behavioral data. The method may include receiving, at an infrastructure device, parameters provided by an administrative device over a local area network (LAN), and configuring, based on the received parameters, the infrastructure device for collection and control of consumer managed behavioral data (CMBD) associated with at least one client device. The method may further include monitoring, at the infrastructure device, data transmitted and received by the at least one client device, and identifying, by the infrastructure device, CMBD from the monitored data based on the received parameters. The method may further include performing actions associated with the at least one client device based on the CMBD and the received parameters.

20 Claims, 8 Drawing Sheets

(51) Int. Cl.
 *H04L 29/08* (2006.01)
 *H04L 12/26* (2006.01)
 *H04L 12/24* (2006.01)

(52) U.S. Cl.
 CPC .............. *H04L 43/08* (2013.01); *H04L 67/20* (2013.01); *H04L 41/046* (2013.01); *H04L 67/22* (2013.01)

(56) References Cited

U.S. PATENT DOCUMENTS

| | | | |
|---|---|---|---|
| 9,720,964 B1* | 8/2017 | Hansen | G06F 16/2453 |
| 2001/0011247 A1* | 8/2001 | O'Flaherty | G06Q 20/10 |
| | | | 705/39 |
| 2003/0225614 A1* | 12/2003 | Rodriguez | G06Q 30/0224 |
| | | | 705/14.25 |
| 2007/0055754 A1* | 3/2007 | Robbin | G07F 17/16 |
| | | | 709/223 |
| 2010/0058446 A1* | 3/2010 | Thwaites | G06F 21/604 |
| | | | 726/4 |
| 2010/0153566 A1* | 6/2010 | Sheleheda | G06F 17/30997 |
| | | | 709/229 |
| 2010/0180013 A1* | 7/2010 | Shkedi | H04L 67/306 |
| | | | 709/219 |
| 2011/0244837 A1* | 10/2011 | Murata | H04W 4/021 |
| | | | 455/414.1 |
| 2013/0145007 A1* | 6/2013 | Randazzo | H04W 48/04 |
| | | | 709/223 |
| 2013/0225151 A1* | 8/2013 | King | H04W 4/21 |
| | | | 455/419 |
| 2013/0305322 A1* | 11/2013 | Raleigh | G06Q 30/016 |
| | | | 726/4 |
| 2014/0122670 A1* | 5/2014 | Levy | H04L 41/0893 |
| | | | 709/220 |
| 2014/0337429 A1* | 11/2014 | Asenjo | H04L 65/403 |
| | | | 709/204 |
| 2015/0180774 A1* | 6/2015 | Loach | H04L 45/74 |
| | | | 370/392 |
| 2015/0256423 A1* | 9/2015 | Stearns | H04L 43/045 |
| | | | 709/224 |
| 2015/0278855 A1* | 10/2015 | Khoury | G06Q 30/0273 |
| | | | 705/14.49 |
| 2018/0191678 A1* | 7/2018 | Polcha, Sr. | H04L 12/4604 |

\* cited by examiner

| Region | Date | Time | Device | MAC | Type | Size (mb) | In/Out | Application | URL |
|---|---|---|---|---|---|---|---|---|---|
| Home | 10-Sep | | Tablet | | Data | 2.3 | Out | Facebook | |
| | | | | | Data | 1 | In | | |
| | | | | | Voice | 0.13 | Out | | |
| New York City | 4-Sep | | Mobile Phone | | Video | 42 | In | Waze | |
| | 9-Mar | | Laptop | | Video | 23 | In | YouTube | |

○
○
○

| DNS | HTTPS | Header | UID | Wired/Wireles | Speed | Performance |
|---|---|---|---|---|---|---|
| | | | | Wifi (User1) | 25mbps | Excellent |
| | | | | | | |
| | | | | Wifi (User 2) | 13mbps | |
| | | | | Wired | 43mbps | |

SYSTEM AND METHODS FOR CONSUMER MANAGED BEHAVIORAL DATA

RELATED APPLICATION

This U.S. Patent Application claims priority under 35 U.S.C. § 119 to U.S. Provisional Patent Application No. 62/069,075, entitled "SYSTEM AND METHODS FOR CONSUMER MANAGED BEHAVIORAL DATA," and filed on Oct. 27, 2014, the disclosure of which is expressly incorporated herein by reference in its entirety.

BACKGROUND

Organizations commonly collect data generated by users when accessing various networked products and services. Using conventional approaches, an organization's access to consumer behavioral data may be limited to the user's interaction with each company's website(s), product(s), and/or service(s). No single entity has holistic consumer behavioral data across all devices, platforms, products, and/or services. Marketing organizations and internet service providers (ISPs) may wish to access consumer data, but may struggle with privacy issues and/or rely on a customer opt-in process.

BRIEF DESCRIPTION OF THE DRAWINGS

FIG. 3 is a diagram of an exemplary file format for reporting consumer managed behavioral data (CMBD);

DETAILED DESCRIPTION OF THE PREFERRED EMBODIMENTS

Figure 1:
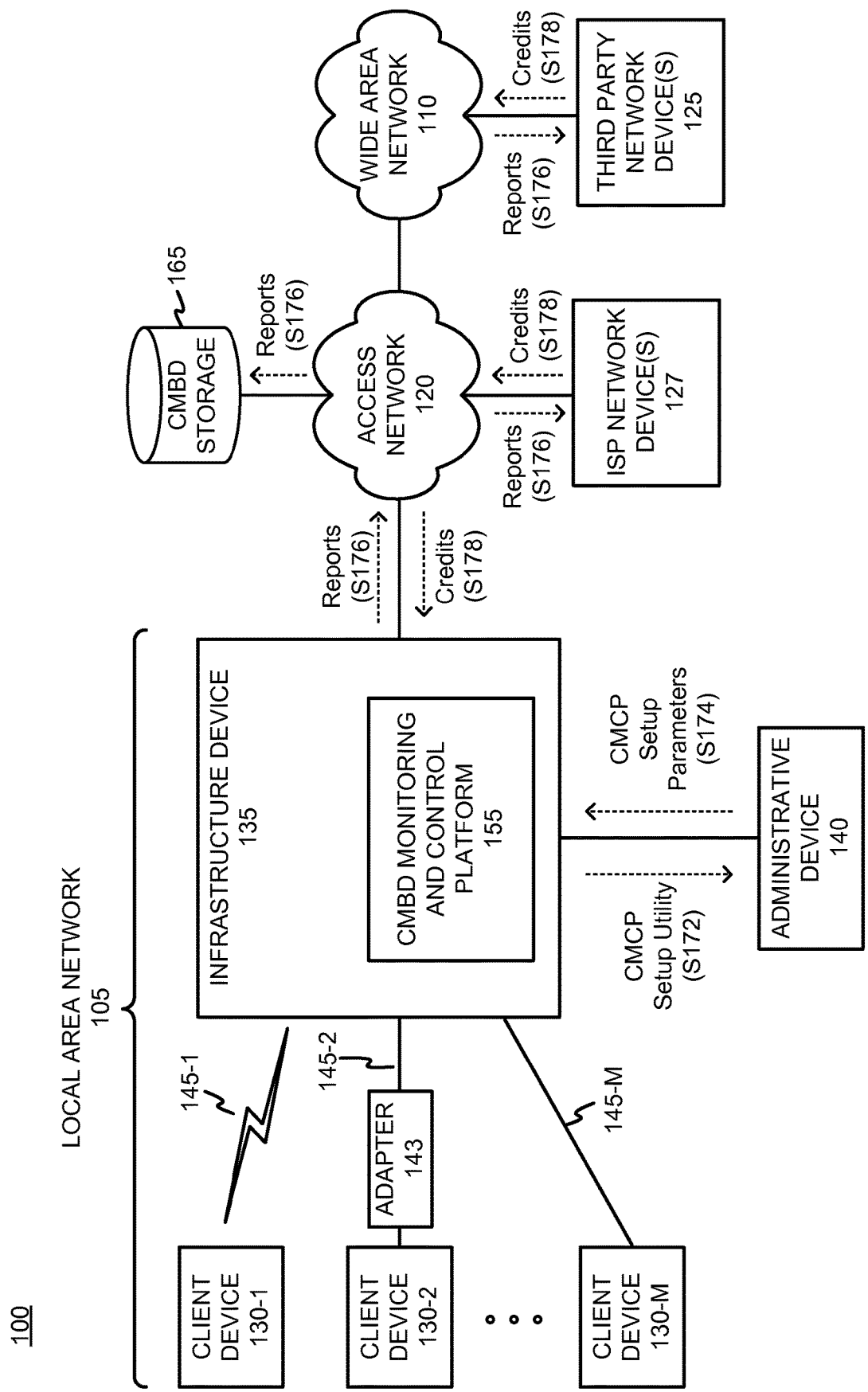
FIG. 1 is a block diagram of an exemplary environment where a consumer can manage behavioral data of client devices within a local area network.

The following detailed description refers to the accompanying drawings. The same reference numbers in different drawings may identify the same or similar elements. The following detailed description does not limit the invention.

Embodiments described herein are directed to systems and methods for allowing an administrative user (also referred to herein as an "administrator") to manage behavioral data for client devices within a local area network (LAN), wherein the LAN is under the purview of the administrative user. The administrative user may be a consumer maintaining a residential LAN having access to a wide area network (WAN) using the services of an internet services provider (ISP). As used herein, the term "behavioral data" (BD) may include any type of data that can be collected, either transmitted to and/or received by client device(s), and which can be used to infer and/or derive consumer behavior. For example, BD may involve network transactions associated with any network destinations accessed by a user, and may include data pertaining to particular items purchased, media consumed (music heard, book read, movies and/or television programs watched, etc.), services purchased, sites visited, search histories, blogs read, comments posted, video and/or voice conversations etc. Such data may be collected, processed, parsed, analyzed, summarized, censored, and/or "anonymized" based on the wishes of the administrative user. Each client device within the LAN may be associated with one or more users. Embodiments may provide the administrator the ability to collect and manage behavioral data to improve the security and privacy of users associated with client devices within the LAN, and produce reports detailing consumer managed behavioral data (CMBD) for review. Additionally, in another embodiment, the administrator may specify that the CMBD, or designated portions thereof, may be provided to third parties in exchange for compensation. Accordingly, the administrator and client users may be customers of residential networking services provided by an ISP, and use the connectivity provided by the ISP to interact with other third party network devices for goods and/or services. In another embodiment, the administrator may be responsible for a LAN providing connectivity in a small business, and wish to control CMBD for the security of the small business.

Embodiments described herein allow the administrative user to collect and control CMBD across e-commerce sites and service providers accessed by client devices in a LAN (or, as in some embodiments described below, clients having network connections outside the LAN) by providing consent (e.g., "opting-in") prior to the collection. By providing individuals with a common interface to monitor and control CMBD, informed consent may be easily and efficiently established to minimize user confusion and frustration, and also ensure conformity with privacy laws and regulations. Moreover, empowering individuals with the capability to easily control and, if so desired, receive compensation for their behavioral data will reduce the potential for consumer backlash associated with privacy issues. For service providers, supporting consumers with a common interface to control behavioral data across a wide spectrum of goods and services, offered by many different parties, overcomes existing challenges with obtaining proper consent now required by various laws and regulations. Moreover, by providing storage of CMBD at a device on the LAN and/or a user designated cloud storage device, CMBD does not have to be stored by an ISP, thus reducing capital equipment costs and avoids privacy issue which may arise from aggregating CMBD from a large number of users.

FIG. 1 is a block diagram of an exemplary network environment 100 where a consumer can manage behavioral data of client device(s) within a local area network. Network environment 100 may include a local area network (LAN) 105, a wide area network (WAN) 110, and an access network 120 which connects LAN 105 with WAN 110. The LAN 105 may include one or more client devices (herein referred to plurally as "client devices 130" and individually as "client device 130-x", where x=1, ..., M), an infrastructure device 135, an administrative device 140, and (optionally) a networking adaptor 143. Infrastructure device 135 may further include a CMBD Monitoring and Control Platform (CMCP) 155. WAN 110 may include connections with third party network device(s) 125. Access network 120 may include connections with ISP network device(s) 127 and CMBD storage device 165.

Within LAN 105, client devices 130 may exchange data with infrastructure device 135 over any wired and/or wireless connection in order to communicate with wide area network 110 through access network 120. For example, client device 130-1 may communicate with infrastructure device 135 via a wireless channel 145-1, which may, for example, be supported by any wireless protocol, such as, for example, WiFi, Bluetooth, and/or a cellular wireless standards. Client device 130-2 may interface with infrastructure device 135 over a wired connection 145-2 which may include existing wiring within a building. For example, through the use of an appropriate adaptor 143, client device 130-2 may exchange data with infrastructure device 135 over a power line, using a power-line adapter, and/or a video cable using a multimedia over coax alliance (MoCA) adaptor. Client device 130-M may exchange data with infrastructure device 135 over conventional wired network connections 145-M, using for example, Ethernet CAT 5 cabling. Administrative device 140 may exchange data with infrastructure device 135 over any wired or wireless channel. Infrastructure device 135 may communicate with wide area network 110 through access network 120 over wired connections to access network using, for example, fiber optic, phone, or video cables provided to the premises associated with LAN 105 by the ISP. In some environments, where a hardline connection to the premises is impractical and/or not cost effective, the infrastructure device 135 may use a wireless connection (e.g., based on a satellite dish or cellular connection) to exchange data with access network 120 and wide area network 110.

Further referring to FIG. 1, infrastructure device 135 may provide support for CMCP 155 to allow an administrator, acting through administrative device 140, to manage behavioral data of clients 130 in LAN 105. Administrative device 140 may receive a CMCP setup utility (S172) to configure the CMCP 155 for the collection and management of CMBD. The CMCP Setup Utility may be an application acting as a companion to CMCP 155, or may a web based interface exchanging data with a web server residing on infrastructure device 135. Through the CMCP setup utility, the administrator may access infrastructure device 135 to collect and manage behavioral data to improve the security and privacy of users of one or more client devices 130 within LAN 105, and produce reports detailing CMBD for review by the administrator. Once entered by the administrator, the administrative device may send CMCP setup parameters to infrastructure device 135 (S174) for use by CMCP 155 for configuration. Once configured, CMCP 155 may monitor data exchanged between clients 130 and other network devices in LAN 105, WAN 110, and/or access network 120, as specified through the CMCP setup parameters.

In more detail, the CMCP setup utility may be used to inform the administrator of the terms and conditions for monitoring and control of CMBD, and indicate acceptance of terms and conditions of monitoring the data, and the sharing of data with third parties, as will be described in more detail below. As the terms and conditions change over time, the terms/conditions may be represented to the administrator to accept any changes which may have occurred. The CMCP setup utility may be used to select and/or register one or more client devices 130, and/or infrastructure device 135, based on a graphical user interface which may show connections between client devices 130 and infrastructure device 135. Selection of client devices 130 for registration and/or configuration may thus be performed by "clicking" on icons for the client device 130-*x* in the graphical user interface. The setup of the monitoring and control of CMBD may be varied depending upon the level of technical skill of the administrator, where the setup may include basic setup procedures (relying upon default parameters) for less technical administrators, to advance configurations allowing detailed control of a large number of parameters which may be used by technically sophisticated administrators.

For example, CMCP 155 may be configured to collect CMBD based on individual client devices 130 and/or particular users of individual client devices 130 if a client device 130-*x* is a multi-user device. CMCP 155 may also be used to control access based on source and/or destination address, network protocols used, content type, data types, access time, client device 130-*x* identification, user identification, application type being used for access on client device 130-*x*, and/or network performance. For example, control and/or monitoring may be performed using a simple "bytes in/bytes out" basis, or more advanced procedure such as, for example, being based on domain names, Hyper Text Transfer Protocol Secure (HTTPS), headers, Uniform Resource Locators (URLs), Domain Name Servers (DNSs), Internet Protocol (IP) addresses, device Media Access Controller (MAC) address, time, Unique Identifier (UID), wired versus wireless connection, speed, etc.

Once client devices 130 are identified for control and management of CMBD in accordance with the set up parameters provided by the administrative device 140, CMCP may generate reports based on the identified CMBD for each designated client device 130-*x*. The reports may be securely stored on LAN 105 within infrastructure device 135, or to a locally attached storage device (not shown). Alternatively, infrastructure device 135 may provide reports for storage on network device (S176) (e.g., CMBD storage 165 acting as "cloud storage") which may be connected to access network 120. From the perspective of an ISP, it may be desirable to have the CMBD data stored at infrastructure devices 135 in LAN 105, as it may lower capital costs for network storage devices used for cloud storage services. Additionally, or alternatively, reports may be provided to a cloud storage device (not shown) over WAN 110. The reports generated by CMCP 155 may be based on templates (i.e., "canned") or may be customized by the administrator, an ISP, and/or a third party who may receive the reports (as discussed in more detail below). The reports may be based on, for example, usage by content type, time, device, application, network performance, connection type, etc. The administrator may specify a frequency for producing periodic reports, which may be provided in various formats that may be compatible with carrier billing systems, standard spreadsheets, comma separated value text files (CSV), or a new format exemplified and described below in relation to FIG. 3.

In another embodiment, infrastructure device 135 may provide reports to ISP network device(s) 127 (S176) via access network 120, and/or third parties network devices 125 via wide area network 110 in return for compensation. The reports may provide relevant data to the ISP (and/or third parties) which may be used for monetization, value added services, and/or targeted or precision marketing. Using administrative device 140, the administrator may configure infrastructure device 135 to control what information is provided to third parties (e.g., particular purchase information generated or anonymized information, etc.), and can control the flow of information based on the designation of each client 130-*x*, and/or individual users when client 130-*x* is a multi-user device. Additionally, because the sharing of CMBD may provide information to advertisers, the sharing of such data permits clients 130 to receive relevant (e.g., targeted/precision) advertising tailored to client's 130-x CMBD. Additionally, the administrator may also control the incoming advertisements with respect to, for example, content and/time, received by each client 130-x. The reports provided to the ISP and/or third parties may be established by contract with the ISP, and/or though the terms and conditions provided by the CMCP setup utility described above.

For example, in exchange providing reports, the administrator (e.g., a customer account associated with LAN 105) may be compensated by receiving credits (S178) and/or discounts from ISP network devices 127 and/or third party network device(s) 125. Credits from third party network device(s) 125 may be provided to infrastructure device 135 over access network 120, and/or may be provided to ISP Network Device(s) 127 to provide a uniform method for compensating the administrator through the ISP's billing infrastructure. The crediting system may be based on money, such as, for example, providing credit to an established credit card account and/or discounts for goods and/or services. For example, credit may be provided in the form of free network access credits through the ISP, or coupons/codes for goods and/or services provided in association with businesses partners of the IPS and/or sponsors of the third party network devices(s) 125. The credits and/or discounts may be provided, for example, based on various criteria ascertained from the CMBD provided in the reports associated with one or more client devices 130. For example, credits/discounts may be rewarded based on based on the type of data and/or the amount of data used by client 130-x, the location of client 130-x, etc. Additionally, infrastructure device 135 may provide raw data and/or reports to CMBD storage 165 over access network 120, and/or other cloud storage devices connected to wide area network 110 (not shown).

Application programming interfaces (APIs) may be used to generate the reports, where the APIs may reside and execute on infrastructure device 135, or, in another embodiment described below in relation to FIG. 2A, a client device 130-x. The APIs may allow raw or processed (e.g., data having identified CMBD) to be transferred automatically based on a predetermined time (e.g., hourly, daily, weekly monthly, etc.). The APIs may update the customer billing records of the administrator with appropriate credits, and, based on the settings provided by the administrator, remove personal information identifying users prior to being sent to third parties.

CMCP 155 may also be set up to provide various notifications based on, for example, data thresholds and/or control breach notifications, to alert the administrator if any client is attempting access which contradicts any setup parameter set by the administrator, or if a client device as gained access by circumventing controls put in place by the administrator. For example, a notification may be sent if a user deactivates a client agent, as described in more detail below in relation to FIG. 2A. The notifications may be sent to the administrator using, for example, a mobile alert, an email, a text, a social media message, etc.)

Client device 130 may include any type of electronic device having communication capabilities, and thus communicate over LAN 105 (or in some embodiments, communicate with access network 120 and/or wide area network 110 outside LAN 105) using a variety of different channels, including both wired and wireless connections. Client device 130 may include, for example, a cellular radiotelephone, a smart phone, a tablet, a set-top box (STB), a mobile phone, any type of IP communications device, a Voice over Internet Protocol (VoIP) device, a desktop computer, a laptop computer, a palmtop computer, a gaming console, a media player device, and/or a digital camera that includes communication capabilities (e.g., wired and/or wireless communication mechanisms). Within LAN 105, client device 130-x may communicate with infrastructure device 135, administrative device 140, and/or other client devices 130 using any wireless and/or wired LAN technology. Wired networking technologies may include TCP/IP, Ethernet, MoCA, power line networking, etc. MoCA and power line networking may utilize adaptor 143. Wireless LAN networks may include WiFi (e.g., any IEEE 801.11x network, where x=a, b, c, g, n, and/or ac), Bluetooth, wireless USB, etc. As noted above, client device 130-x may also communicate outside LAN 105 and thus have WAN networking capabilities, and thus may be compatible with any type wireless network covering larger areas, and may include a mesh network (e.g., IEEE 801.11s), WiMAX IEEE 802.16, and/or cellular networking capabilities. Cellular networking capabilities may include any wireless public land mobile networks (PLMN) technologies, which may include Code Division Multiple Access (CDMA) 2000, a Global System for Mobile Communications (GSM), Long Term Evolution (LTE). The access network 120 may exchange data with wide area network 110 using any known standard(s), which may include backhaul networks, backbone networks, and/or core networks.

Infrastructure device 135 may be any type of device having a network communications capability for supporting CMCP 155 to collect and monitor CMBD in accordance with setup parameters provided by administrative device 140. Infrastructure device 135 may be any type of in-home networking device, or any networking device used in business networks. For example, infrastructure device 135 may be a router, a cable modem, a switch, a wireless access point, a network bridge, a network adaptor, an optical network terminal (ONT), any type of computer or server, a network access storage (NAS) device, a smart television, or a gaming console. In an embodiment, an existing infrastructure device 135 may be modified with software and/or hardware to support collection and monitoring of CMBD in CMCP 155.

For example, CMCP 155 may include infrastructure device 135 which is modified by attaching a hardware dongle, a filter, a probe, a plug/connector, or other attached device, to permit the use of legacy infrastructure network devices 135. Plug/connector devices may be based on, for example, universal serial bus (USB), Ethernet, high definition multimedia interface (HDMI), and/or coaxial cable connections. Additionally or alternatively, CMCP 155 utilize a software component running on the infrastructure device 135, which may be packaged as an application, a process, a service, etc. Software and/or hardware may permit CMCP 155 to perform a wide variety of functions for monitoring and controlling CMBD. Such functions may include automatic data type characterization (e.g., data, voice, video, text, etc.), policy control, report generation (both text and graphical such as dashboards), and self-learning capabilities to adapt the monitoring and control of data exchanged with client devices 130 and network devices connected to WAN 110. Additionally, CMBD from client devices 130 may be captured in the back end network, such as, for example, access network 120 and/or wide area network 110, and be provided to CMCP 155 for monitoring and/or control by the administrator of LAN 105. This may be especially useful for client devices 130 which are mobile devices, such as, for example, smartphones, tablets, laptops, etc., which may leave the confines of LAN 105 and access WAN 110 at a different location, where the connection to WAN 110 may be over a different connection type that was used to connect client device 130-x with LAN 105. Aspects of client devices monitoring and collection CMBD upon migrating their network connection from LAN 105 to WAN 130-1 are described in detail below in reference to FIGS. 2A and 2B.

Further referring to FIG. 1, administrative device 140 may be any electronic device having communication capabilities with LAN 105 which is suitable for allowing the administrator to setup and configure infrastructure device 135 for the monitoring and control of CMBD. In some embodiments, administrative device 140 may also serve as a client device for a user who is also an administrator of LAN 105. Administrative device 140 may include a desktop computer, a laptop, a smart phone, a tablet, a set-top box (STB), a smart television, and/or a gaming console/device. Within LAN 105, client device 130-x may communicate with infrastructure device 135, administrative device 140, and/or other client devices 130 using any wireless and/or wired LAN technology. Administrative device 140 may connect with infrastructure device 135 using wired networking technologies (e.g., TCP/IP, Ethernet, MoCA, power line networking, etc.), and/or wireless networking technologies (e.g., WiFi, such as any IEEE 801.11x network, where x=a, b, c, g, n, and/or ac, Bluetooth, wireless USB, etc.).

Wide area network 110 may be any type of wide area network connecting back-haul networks and/or core networks, and may include a metropolitan area network (MAN), an intranet, the Internet, a cable-based network (e.g., an optical cable network), networks operating known protocols, including Asynchronous Transfer Mode (ATM), Optical Transport Network (OTN), Synchronous Optical Networking (SONET), Synchronous Digital Hierarchy (SDH), Multiprotocol Label Switching (MPLS), and/or Transmission Control Protocol/Internet Protocol (TCP/IP).

Access network 120 may be any type network supported by an ISP which facilitates a service providing the connection of end-user network devices with WAN 110, and third party network devices 125 connected thereto. The end-user devices may include devices within LAN 105, such as, for example, client devices 130, infrastructure device 135, and/ or administrative device 140 for residential and/or business customers. Access network 120 may include Cell Site Routers (CSRs), Extended Back Haul (EBH) network(s), optical networks which include wavelength division multiplexed (WDM) optical components, multiservice provisioning platforms (MSPPs), metro-Ethernet networks, etc.

Third party network device 125 may be any network device having wired and/or wireless communication capability with WAN 110 that may provide goods and/or services based upon CMBD associated with client devices 130. Accordingly, third party network device may be any type of computer, server, cloud based device, etc., that may receive reports (S176) associated with CMBD of client devices 130, may provide credits (S178) in exchange for receiving reports, and/or may provide advertisements based on the received CMBD. Third party network device(s) 125 may be supported, for example, by retailers, marketers, advertisers, researchers, government agencies, etc. The credits given in exchange for CMBD may be provided to end user administrators of LAN 105, or may be provided through billing mechanisms associated with the ISP supporting access network 120.

ISP network device(s) 127 may be any network devices having wired and/or wireless communication capability with access network 120 that may support networking services for customers connected to local area networks (e.g., LAN 105). ISP network device(s) 127 may be any type of computer, server, cloud based device, etc., that may support access network 120. In an embodiment, ISP network devices may receive reports (S176) associated with CMBD of client devices 130, may provide credits (S178) in exchange for receiving reports, and/or may provide advertisements based on the received CMBD. The credits given in exchange for CMBD may be provided to end user administrators of LAN 105 through billing mechanisms associated with the ISP.

CMBD storage 165 may be a cloud based storage device, which may be supported by the ISP to store CMBD data and/or reports. In other embodiments, CMBD storage may be supported by devices connected to wide area network 110. CMBD storage 165 may utilize various computer devices, servers, storage arrays, etc., which may securely store CMBD data and or reports generated therefrom.

While FIG. 1 shows exemplary components networking environment 100, in other implementations, networking environment 100 may include fewer components, different components, differently arranged components, or additional components than depicted in FIG. 1. Additionally or alternatively, one or more components of networking environment 100 may perform functions described as being performed by one or more other components of networking system 100.

Figure 2A:
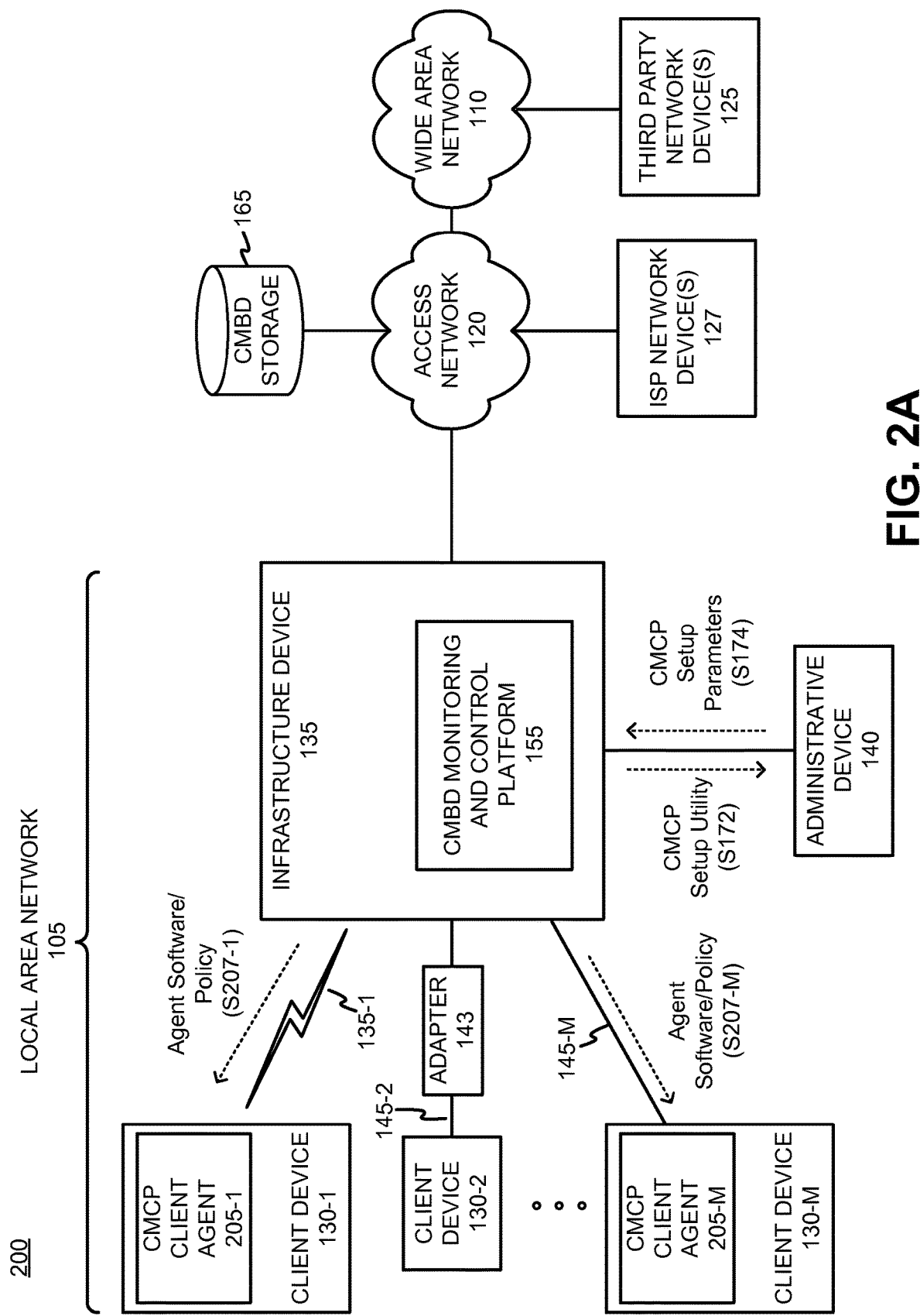
FIGS. 2A and 2B are block diagrams of an exemplary environment where a consumer can configure a client device to manage behavioral data when the client device is outside a local area network.
Figure 2B:
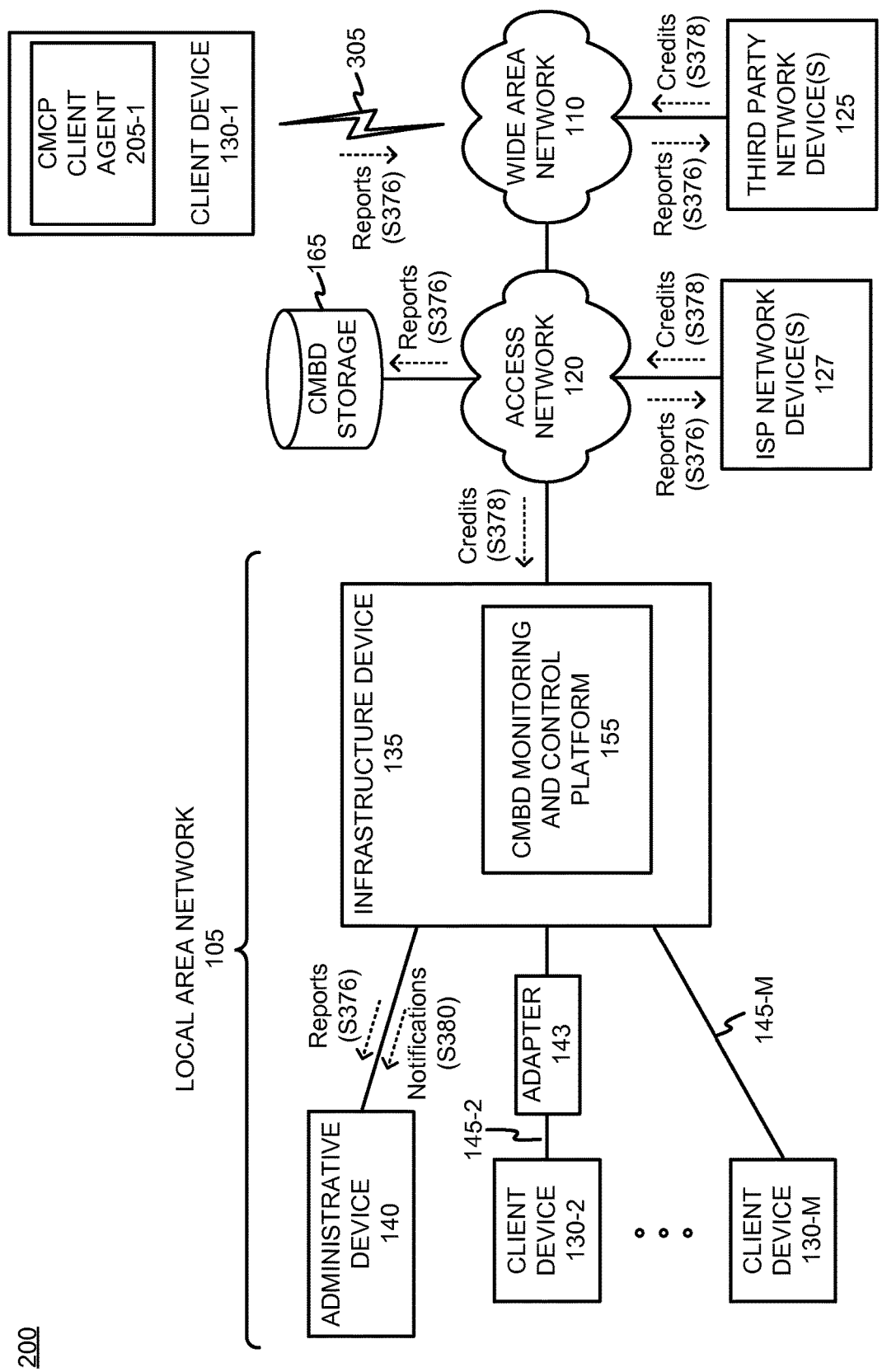

FIGS. 2A and 2B are block diagrams of an exemplary network environment 200 where an administrator can configure a client device to manage behavioral data for a client outside of LAN 105. Network environment 200 may include LAN 105, WAN 110, and access network 120 which connects LAN 105 with WAN 110. LAN 105 may include one or more client devices 130, infrastructure device 135, administrative device 140, and (optionally) networking adaptor 143. Infrastructure device 135 may further include CMCP 155. WAN 110 may include connections with third party network device(s) 125. Access network 120 may include connections with ISP network device(s) 127 and CMBD storage device 165. Elements in FIGS. 2A and 2B having reference numbers in common with elements shown in FIG. 1 may include similar attributes in structure and/or function. For brevity, the similar attributes of commonly numbered elements already described above in reference to FIG. 1 will not be described again for FIGS. 2A and 2B.

When client devices 130 are connected to infrastructure device 135 within LAN 105 (either using a wired connection or a wireless connection), CMCP 155 operating within (or in some embodiments, as discussed in relation to FIG. 4, in conjunction with) infrastructure device 135 may monitor and control CMBD of client devices 130. However, when a client 130-x moves outside of LAN 105, infrastructure device 135 no longer receives data exchanged between client device 130-x and other network devices, and thus cannot monitor and control CMBD of client 130-x. As noted above, client device 130-x may take on a variety of embodiments which are commonly referred to as "mobile devices," and may be designed to easily attach to networks outside LAN 105. Such mobile devices may include smart phones, tablets, laptops, portable gaming devices, music players, etc., which may be compatible with wireless networks, such as, for example, Bluetooth, cellular, and/or in WiFi hot spots, found malls, restaurants, shops, and/or in other individuals' homes.

In order for the administrator of LAN 105 to monitor and control CMBD transmitted and received from client device 130-x outside of LAN 105, a software agent may be "pushed" to client device 130-x which performs the functionality of CMCP 155 when client 130-x is outside of LAN 105 exchanging data with other network devices. The software agent, which may execute on client device 130-x, is referred to herein as a CMCP client agent (plurally as "CMCP client agents 205" and individually as "CMCP client agent 205-x", where x=1, . . . , M). Similar to the infrastructure device 135, CMCP client agent 205-x may monitor all data exchanged between client device 130-x and other network devices, regardless of the type of network connection (e.g., wired or wireless) used by client device 130-x. CMCP client agent 205-x may identify CMBD to access CMBD monitored and controlled by client devices 130, and reports may be generated and provided to the LAN 105, where the reports may be stored on infrastructure device 135, and provided to the administrator through the administrative device 140. Additionally, CMCP client agents 205 may allow the administrator to track and/or remotely control client devices 130 on which they are installed. Such control may be automatic based on CMBD data, and/or may be manually initiated by the administrator. CMCP client agents 205 may block and/or filter CMBD in the same manner as CMCP 155 described above, which may include, for example, actions based on destination addresses (e.g., URLs, IPs, etc.), content type, domain identities, connection type, time/date, user ID, etc. Details of configuring a client device 130-x to monitor CMBD are provided below.

Further referring to FIG. 2A, in order to set up a client device 130-x to monitor and control CMBD when outside of LAN 105, infrastructure device 155 may provide administrative device with CMCP setup utility to administrative device 140 (S172). Using the administrative device 140, the administrator may initially create a master policy to manage client devices 130 which may interconnect with other networks outside LAN 105. The master policy may provide a convenient way to administer a group of designated client devices 130 with a single policy. However, the administrator may customize policies for each client device 130-x if desired (for example, by modifying a master policy). The master policy may be stored in infrastructure device 135, administrative device 140, and/or a network device within LAN 105. Additionally or alternatively, the master policy may be stored outside of LAN 105, in, for example, CMBD cloud storage device 165 and/or network attached storage accessible over WAN 110.

Administrative device 140 may provide CMCP setup parameters to infrastructure device 135 (S174) which may include the configured master policy (or parameters thereof) for configuration by CMCP 155. Once the master policy is configured, infrastructure device 135 may initially push agent software client devices 130 designated to receive CMCP Client Agents 205 (S207). For example, as shown in FIG. 2A, client device 130-1 (which may be, for example, a smart phone) receives CMCP Client Agent 205-1, configured by the master policy, through agent software/policy push (S207-1) over wireless channel 135-1 from infrastructure device 135. Client device 130-M (which may be, for example, a laptop) receives CMCP Client Agent 205-M, configured by the master policy, through agent software/policy push (S207-M) over wired channel 135-M from infrastructure device 135. Because a single master policy may be pushed out to all client devices 130, it may be convenient for an administrator to change and/or update the master policy to affect multiple client devices 130 with a single command. Moreover, the administrator may have the option to have custom policies pushed out to any client device 130-x in place of a master policy, or as a modification to a previously provided master policy. Modifications to policies may be manually performed and pushed out by the administrator, or, in another embodiment, modifications to policies may be performed automatically (e.g., by administrative device 140) through as self-learning process, and pushed out manually once reviewed by the administrator (e.g., using a "one click" update). Additionally or alternatively, policy updates may be pushed out automatically at the command of administrative device 140 and/or infrastructure device 135.

Once the client devices 130, as designated by the administrator, have been configured with CMCP client agents 205 and an appropriate policy (e.g., master policy), the CMCP client agents 205 may monitor and control CMBD of clients designated clients 130 when communicating over any wireless channels outside the purview of infrastructure device 135. For example, as shown in FIG. 2B, client device 130-1 may be physically moved into an area where communications may occur over a wireless channel 305 with WAN 110. CMBD data may be monitored by CMCP client agent 205-1 regardless of the type of wireless channel 305, which may be, for example a wireless channel based on WiFi, cellular, Bluetooth Low Energy (LE), etc. Moreover, CMCP client agents 205 may track and control the clients 130 on which they are installed. CMCP client agent 205-1 may create reports and statistics based on the network usage of client device 130-1 in a manner similar to the reports created by CMCP 155 described above. For example, reports/statistics may be based on device/user identity, by network destinations (e.g., site URLs), by content type, by searches made on the device, etc. The reports may be provided to the administrator to, for example, administrative device 140 via infrastructure device 135, and/or directly to another device (not shown) designated by the administrator. Reports sent by client device 130-1 (S376) may also be provided to third party network devices 125, ISP network devices 127, and/or CMBD storage 165, either directly from client device 130-1, or indirectly from infrastructure device 135. Credits may be provided to infrastructure device 135 (S378) based on reports generated from CMBD data for client device 130-1, which may be provided by third party network device(s) 125 and/or ISP network device(s) 127.

Further referring to FIG. 2B, in another embodiment client device 130-1 may provide notifications to the administrator (e.g., via administrative device 140) (S380) if any breaches of the master policy (or the policy customized to client device 130-1) are determined. In another embodiment, the administrative device 140, infrastructure device, and/or another device designated by the administrator (e.g., a server or mobile device either on LAN 105 or another network such as WAN 110) may periodically check designated client devices 130 when they connected to a network outside of LAN 105 (e.g., WAN 110) to ensure the client agents 205 are installed and working properly. For example, if a periodic check reveals client agent 205-1 is disabled, a notification may be provided to the administrator via email, text, phone call, social media, etc. Alternatively, automatic actions may be performed (for example, by administrative device, infrastructure device, etc.) which can disable the account for client device 130-1 and/or disable functionality on client device 130-1. For example, an action may deny data access for client device 130-1, but permit voice access. Disabled functionality may be restored upon detection that the client agent 205-1 has been reactivated. In alternative embodiments, the administrator may perform such actions manually via administrative device 140 (or another device designated by the administrator. Additionally, records of breaches may be stored in client device 130-1, in a network device connected to LAN 105 (e.g., administrative device 140 and/or infrastructure device 135), and/or another device designated by the administrator.

Additionally, in alternate embodiments, if a common ISP supports multiple types of network connections for a client device 130-*x* (e.g., the ISP provides networking service to LAN 135 and provides cellular service to client device 130-1, CMCP client agents 205 may be managed at the network level in addition or as an alternative to remote control performed by the administrative device 140.

Further referring to FIGS. 2A and 2B, the following description provides a number of examples of monitoring and control of CMBD consistent with network environment 200. For example, an administrator may use CMCP 155 to monitor and control all devices within LAN 105 by pushing CMBD client agents and policies to client devices 130. A user of a client device 130-1 may attempt to access a site (or a content type) which is not allowed by the policy installed on client device 130-1, and as a result block client device 130-1 from accessing the restricted site or content. The user of client device 130-1 may send a message to the administrator requesting access (or alternatively, the administrator receives a notification). The administrator may update and push out a new policy to client device 130-1 (e.g., using administrative device 140 and/or another designated device, immediately over WAN 110, or after client device 130-1 reconnects to LAN 105) to permit the user to access the content.

In another example, an administrator may travel with his/her family to hotel on vacation where each family member may access WAN 110 over the hotel's WiFi network using their respective client devices 130, each having a respective client agent 205-*x* which were installed previously by the administrator. The CMBD of each client device 130 may be monitored and controlled while accessing the hotel WiFi network.

In another example, assume that an administrator was unable to contact a user associated with client device 130-1 after a number of attempts. The administrator may then remotely (via administrative device 140 or another designated device) restrict network data access for client device 130-1, and further lock the dial pad of client device 130-1 so it may only be used to dial a number associated with the administrator. Once the user of client device 130-1 contacts the administrator, the administrator may restore the network data and voice access for client 130-1.

While FIGS. 2A and 2B show exemplary components of network environment 200, in other implementations, network environment 200 may include fewer components, different components, differently arranged components, or additional components than depicted in FIGS. 2A and 2B. Additionally or alternatively, one or more components of network environment 200 may perform functions described as being performed by one or more other components of network environment 200.

FIG. 3 is a diagram of an exemplary file format 300 for reporting consumer managed behavioral data (i.e., a "CMBD file"). The CMBD file format may be based on the type of API used to extract the CMBD, and may further include formats which are compatible with existing billing formats used by an ISP which supports access network 120. Additionally or alternatively, any type of text or binary format may be used to store the reports. For example, the reports may be stored in a comma separated value (CSV) format, or as text arranged into an array as shown in FIG. 3. Columns in the array may represent different data fields, while rows may represent different instances in time. Columns may include a region where the data communication took place (e.g., state, city, etc.), a date and time associated with the data communication, the type of device (e.g., tablet, smart phone, laptop), a media access controller (MAC) address specifically identifying the device, type of data communication (e.g., network data, voice, video, etc.), the size of the data communication, whether the data communication was incoming or outgoing, an application (e.g., Facebook, YouTube, etc.) associated with the data communication, a uniform resource locator (URL) associated with the communication, a domain name system (DNS) address used by the client during the data communication, a hypertext transfer protocol secure (HTTPS) notification, a header, or a unique identifier number (UID) associated with the data communication, an indication if the data communication occurred over a wired or wireless connection, the data communication speed (e.g., average number of bits per second), and/or an indication of the relative performance of the data communication (e.g., speed, error rate, signal strength, interference level, etc.). Other file identifiers may include, for example, the name(s) of the users associated with a particular client device 130-*x*, which may be useful if the device is a multi-user device. The CMBD file may be edited prior to export based on the administrator's preferences. For example, prior to exchanging the CMBD file with a third party, the administrator may remove any identifying information to "anonymize" the report. In one embodiment, an API may be used to anonymize the data used in the report when desired.

Figure 4:
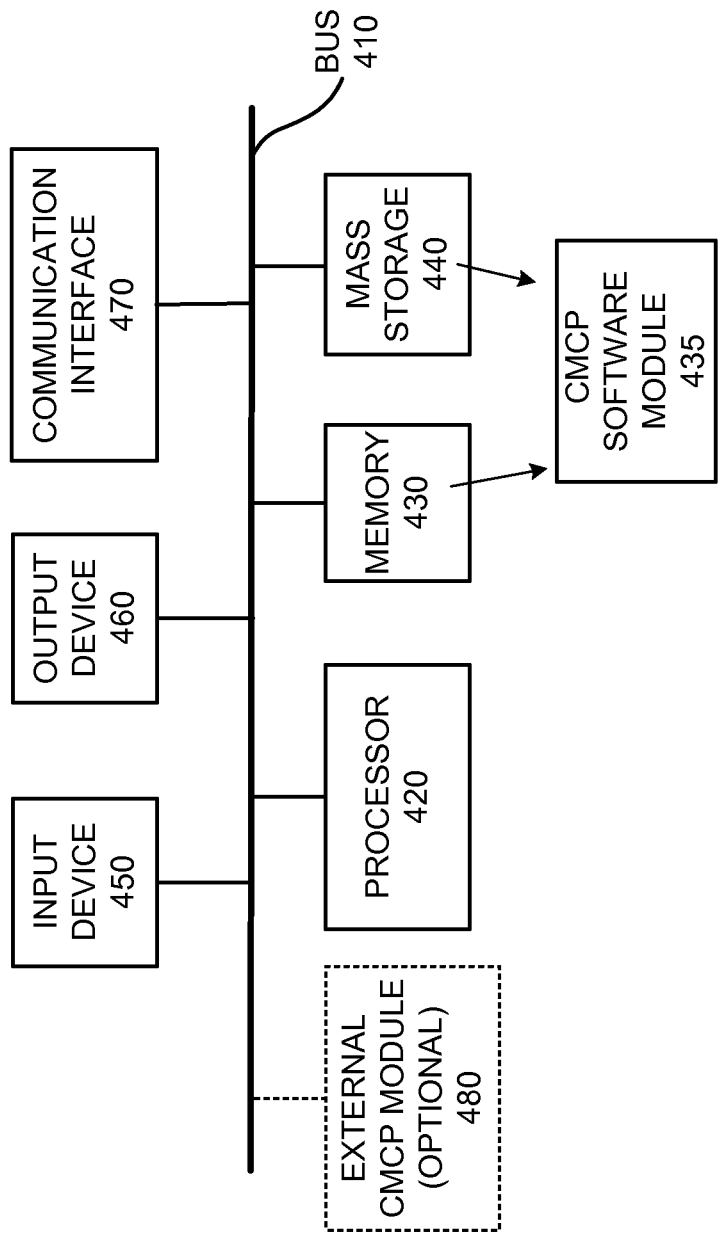
FIG. 4 is a block diagram showing exemplary components of an infrastructure device according to an embodiment.

FIG. 4 is a block diagram showing exemplary components of an infrastructure device 135 according to an embodiment. Infrastructure device 135 may be any type of device having network communications capability for supporting CMCP 155 to collect and monitor CMBD in accordance with setup parameters provided by administrative device 140. Infrastructure device 135 may be any type of in-home networking device, or any networking device used in business networks. For example, infrastructure device 135 may be a router, a cable modem, a switch, a wireless access point, a network bridge, a network adaptor, an optical network terminal (ONT), any type of computer or server, a network access storage (NAS) device, a smart television, or a gaming console. Infrastructure device 135 may include a bus 410, a processor 420, a memory 430, mass storage 440, an input device 450, an output device 460, and a communication interface 470. CMCP functionality may be provided by CMCP software module residing in memory 430 and/or mass storage 440, and/or by an optional hardware external module 480

Bus 410 includes a path that permits communication among the components of infrastructure device 135. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. For example, the processor 420 may be an x86 based CPU, and may use any operating system, which may include varieties of the Windows, UNIX, and/or Linux. The processor 420 may also use high-level analysis software packages and/or custom software written in any programming and/or scripting languages for interacting with other network entities are communicatively coupled to networking system 100/200.

Memory 430 may include any type of dynamic storage device that may store information and/or instructions, for execution by processor 420, and/or any type of non-volatile storage device that may store information for use by processor 420. For example, memory 430 may include a RAM or another type of dynamic storage device, a ROM device or another type of static storage device, and/or a removable form of memory, such as a flash memory. Mass storage device 440 may include any type of on-board device suitable for storing large amounts of data, and may include one or more hard drives, solid state drives, and/or various types of redundant array of independent disk (RAID) arrays. CMCP software module 435, and various parameters, master policies, and/or custom policies, may be stored in mass storage device 440, and, either in whole or in part, in memory 430 for execution on processor 420. CMCP software module 435 may be a process, service, agent, and/or application running on infrastructure device 135.

Input device 450, which may be optional, can allow an operator to input information into infrastructure device 135, if required. Input device 450 may include, for example, a keyboard, a mouse, a pen, a microphone, a remote control, an audio capture device, an image and/or video capture device, a touch-screen display, and/or another type of input device. In some embodiments, such as when infrastructure device 135 is embodied within a router or an ONT, infrastructure device 135 may be managed remotely by another device (e.g., administrative device 140) and thus may not include input device 450. Output device 460 may output information to an operator of infrastructure device 135. Output device 460 may include a display (such as an liquid crystal display (LCD)), a printer, a speaker, and/or another type of output device. In some embodiments, when infrastructure device 135 is managed remotely, output device 450 may not be present.

Communication interface 470 may include one or more transceivers that enable infrastructure device 135 to communicate within networking environment 100/200 with other devices and/or systems. The communications interface 470 may be configured for wireless communications (e.g., RF, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 470 may include a transmitter that converts baseband signals to RF signals and/or a receiver that converts RF signals to baseband signals. Communication interface 470 may be coupled to one or more antennas for transmitting and receiving RF signals. Communication interface 470 may include a logical component that includes input and/or output ports, input and/or output systems, and/or other input and output components that facilitate the transmission/reception of data to/from other devices. For example, communication interface 470 may include a network interface card (e.g., Ethernet card) for wired communications and/or a wireless network interface (e.g., a WiFi) card for wireless communications. Communication interface 470 may also include a USB port for communications over a cable, a Bluetooth® wireless interface, an RFID interface, an NFC wireless interface, and/or any other type of interface that converts data from one form to another form.

External CMCP module 480 may be a hardware device coupled to infrastructure device 135 to upgrade existing network devices with the capability to perform monitoring and control CMBD. External CMCP module 480 may be coupled to infrastructure device 135 through a hardware dongle, a filter, a probe, a plug/connector, or other attached device, to permit the use of legacy infrastructure network devices 135. Plug/connector devices may be based on, for example, USB, Ethernet, HDMI, and/or coax connections. External CMCP module 480 may also be used in conjunction with software stored in memory 430 and/or mass storage device 440.

As described below, infrastructure device 135 may perform certain operations relating to managing and controlling CMBD on LAN 105. Infrastructure device 135 may perform these operations in response to processor 420 executing software instructions contained in a computer-readable medium, such as memory 430 and/or mass storage 440. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of infrastructure device 135, in other implementations, infrastructure device 135 may include fewer components, different components, additional components, or differently arranged components than depicted in FIG. 4.

Figure 5:
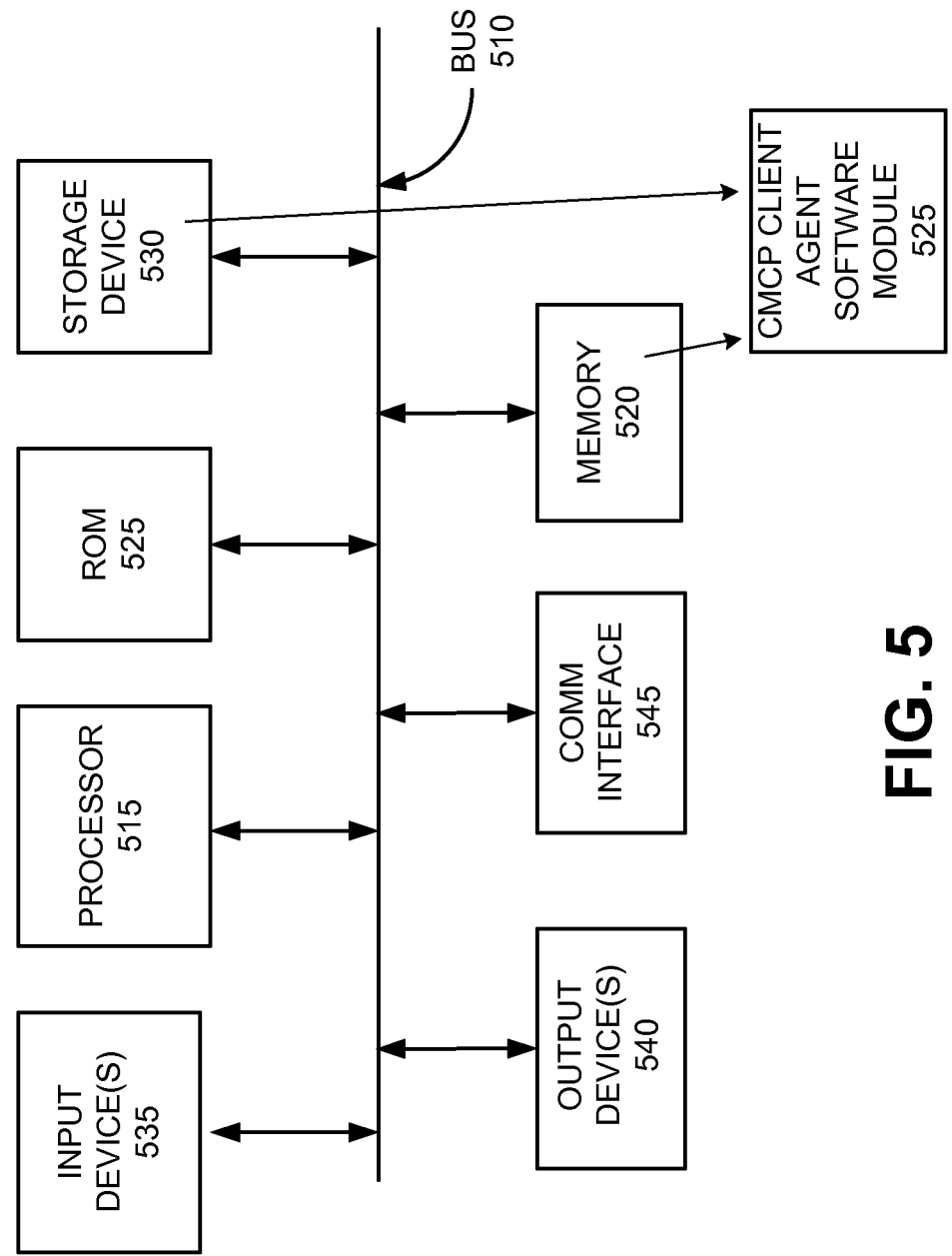
FIG. 5 is a block diagram showing exemplary components of a client device according to an embodiment.

FIG. 5 is a block diagram showing exemplary components of a client device 130-$x$ according to an embodiment. Client device 130-$x$ may include a bus 510, a processor 515, memory 520, a read only memory (ROM) 525, a storage device 530, one or more input device(s) 535, one or more output device(s) 540, and a communication interface 545. Bus 510 may include a path that permits communication among the elements of client device 130-$x$.

Processor 515 may include a processor, microprocessor, or processing logic that may interpret and execute instructions. Memory 520 may include a random access memory (RAM) or another type of dynamic storage device that may store information and instructions for execution by processor 515. ROM 525 may include a ROM device or another type of static storage device that may store static information and instructions for use by processor 515. Storage device 530 may include a magnetic and/or optical recording medium and its corresponding drive. CMCP client agent software module 525, and various parameters, master policies, and/or custom policies, may be stored in storage device 530, and, either in whole or in part, in memory 520 for execution on processor 515. CMCP client agent software module 525 may be a process, service, agent, and/or application running on infrastructure device 135-$x$ which may allow monitoring and control of CMBD on client device 130-$x$ when client device 130-$x$ is connected to a network other than LAN 105 over any wired or wireless connection. CMCP client agent software module 525 may further provide the capability for an administrator to remotely control client device 135-$x$ by permitting and/or restricting communications and/or other functionality.

Input device(s) 535 may include one or more mechanisms that permit an operator to input information to client device 135-$x$, such as, for example, a keypad or a keyboard, a microphone, voice recognition, components for a touch-screen, and/or biometric mechanisms, etc. Output device(s) 540 may include one or more mechanisms that output information to the operator, including a display, a speaker, etc. Communication interface 545 may include any transceiver mechanism that enables client device 135-$x$ to communicate with other devices and/or systems. For example, communication interface 545 may include mechanisms for communicating with another device or system via a network, such as LAN 105, access network 120, and/or WAN 110.

Client device 135-*x* may perform certain operations or processes to support the monitoring and control of CMBD. Client device 135-*x* may perform these operations in response to processor 515 executing software instructions contained in a computer-readable medium, such as memory 520 and/or storage device 530. A computer-readable medium may be defined as a physical or logical memory device. A logical memory device may include memory space within a single physical memory device or spread across multiple physical memory devices. The software instructions may be read into memory 520 from another computer-readable medium, such as storage device 530, or from another device via communication interface 545. The software instructions contained in memory 520 may cause processor 515 to perform operations or processes that will be described in detail with respect to FIG. 7. The software instructions may include APIs, which may be supplied by the ISP or third parties that permit raw and/or processed data to be transferred automatically at a pre-established time or frequency. The APIs may generate reports and update customer billing records and credits. API may make anonymous CMBD based on customer preferences and have it pushed to big data servers. The APIs may facilitate using the CMBD for monetization, value added services, and/or precision marketing.

Alternatively, client device 135-*x* may use hardwired circuitry in place of or in combination with software instructions to implement processes consistent with the principles of the embodiments. Thus, exemplary implementations are not limited to any specific combination of hardware circuitry and software.

The configuration of components of mobile device 105 illustrated in FIG. 5 is for illustrative purposes only. It should be understood that other configurations may be implemented. Therefore, client device 135-*x* may include additional, fewer and/or different components than those depicted in FIG. 5.

Figure 6:
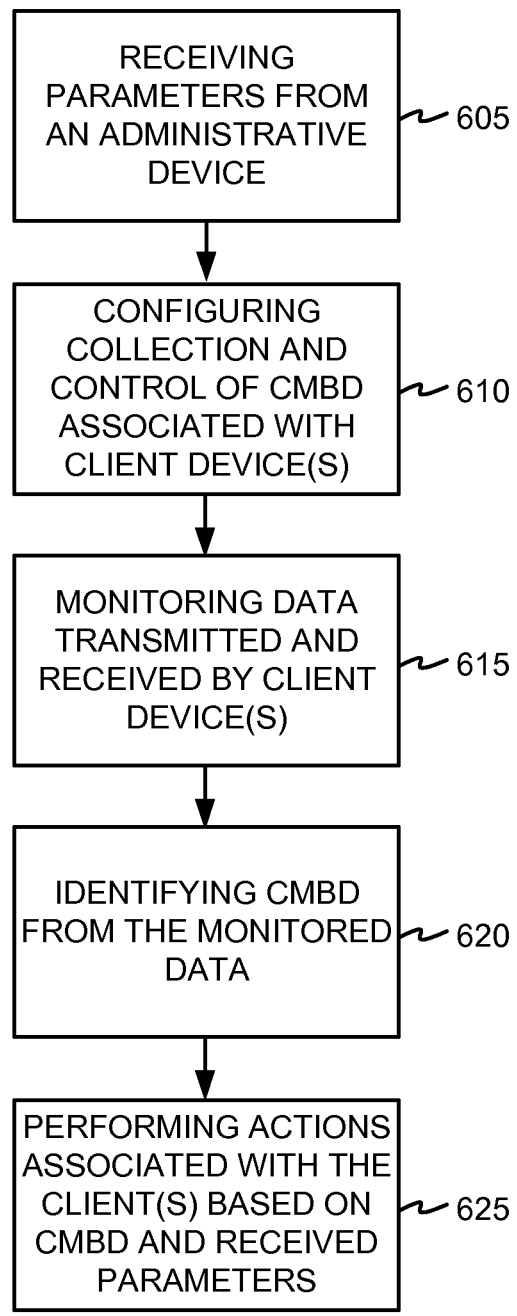
FIG. 6 is a flow chart showing an exemplary process for managing behavioral data within a local area network (LAN)

FIG. 6 is a flow chart showing an exemplary process 600 for managing behavioral data within a LAN. In one embodiment, process 600 may execute on processor 420 in infrastructure device 135. Processor 420 may initially receive parameters provided by an administrative device over LAN 105 (605). Such parameters may include values for specifying client devices 130 for control and monitoring of CMBD, designating devices for receiving CMCP client agent 205-*x* for having client device 130-*x* perform its own monitoring and control when connected to networks other than LAN 105. In an embodiment, the parameters may include an acknowledgment of terms and conditions for monitoring, identifying, and performing actions based on CMBD. The received acknowledgement parameters may also include consent for monitoring, controlling and monetizing CMBD when during an initial setup process, and thereafter, terms and conditions change. In such circumstances, CMCP 155 may prompt the administrator of such changes, and request consent be provided again in response to the changes in terms and conditions. The received parameters may also specify the selection of the client device(s) 130 for monitoring and controlling CMBD, and may further include a selection of a type of monitoring and identification of CMBD (e.g., monitoring HTTPS connections and identifying purchases). The received parameters may also include a designation of a data threshold to trigger data monitoring. In another embodiment, the received parameters may be associated with permission to export a report to a third party network device information that is derived from the identified CMBD for compensation. The exported report may be based on the selection of a user designation, a client device designation, an application type, a connection type, a connection quality, a content type, a traffic type, a protocol type, a network address, a time, a date, and/or location associated with client device(s) 130.

Processor 420 may then configure, based on the received parameters, infrastructure device 135 for collection and control of Consumer Managed Behavioral Data (CMBD) associated with client device(s) 130 (610). Processor 420 may then monitor data transmitted and received by client device(s) 130 (615). The monitoring may occur by comparing incoming bytes and outgoing bytes, or may include searching based on metadata which may be associated with the exchanged data (e.g., header data, network addresses, network connection type, etc.).

Processor 420 may identify CMBD from the monitored data based on the received control parameters (620). In an embodiment, processor 420 may identify CMBD based on a user designation, a device designation, a connection type, connection quality, a traffic type, a protocol type, a network address, a time, a date, and/or location associated with the client device(s) 130. For example, processor 420 may identifying data based on a domain identifier, a network header, a hypertext transfer protocol (HTTP) address, a uniform resource location (URL) identifier, a domain name server (DNS) identifier, an internet protocol address, a user identifier (UID), a media access controller (MAC) identifier, a wireless or wired connection type, and/or connection speed.

Processor 420 may perform actions associated with the at least one device based on the CMBD and the received parameters (625). In one embodiment, performing actions may include having processor 420 generate reports based on the identified CMBD, store the generated reports infrastructure device 135 in memory 430 and/or mass storage device 440. Processor 420 may then provide the reports to a network device based on the received parameters. In one embodiment, processor 420 may create reports based on the received parameters and the CMBD. The created reports may indicate network usage based on a user designation, a device designation, an application designation, a connection type, connection quality, a content type, a traffic type, a protocol type, a network address, a time, a date, and/or location associated with client device(s) 130. In an embodiment, processor 420 may send the reports to administrative device 140, ISP network device(s) 127, and/or third party network device(s) 125 based on the received parameters. In another embodiment, processor 420 may provide the reports to third party network device(s) 125 based on the received parameters, and may receive credit from third party network device(s) 125, and/or ISP network devices 127, in exchange for the sent reports.

In another embodiment, processor 420 may identify an event associated client device(s) 130, send notifications regarding the identified event to a network device. The network device may be specified in the received parameters. Processor 420 may identify an event by determining, based on the received parameters, a state of monitoring associated with client device(s) 130. The state of monitoring may include how to monitor the data, whether monitoring is performed on a byte-by-byte basis, where all data sent to and received from client device(s) 130 is examined, or only portions thereof, based on, for example search terms, data structures, etc. Additionally, processor 420 may provide notifications that may include sending an email, a text message, a mobile alert, and/or a social media announcement to administrative device 140, and/or some other network device specified by the administrator. In another embodiment, processor 420 may further configure client device(s) 130 for being controlled remotely by another network device based on the identified event.

In another embodiment, processor 420 may provide over LAN 105 to a remote client device (e.g., 130-1 in FIG. 2B), a CMCP client agent 205-1 which may execute on remote client device 130-1 to monitor data transmitted and received by remote client device 130-1 over a second network external to the LAN (e.g., WAN 110). Remote client device 130-1 may identify CMBD from the monitored data, and send a remote client report based on the CMBD to infrastructure device 135 and/or another network device (e.g., administrative device 140, ISP network device(s) 127. Administrative device 140 or the network device may periodically check the operational status of client agent 130-1, and provide a notification and/or disable at least a portion of a functionality of remote client device 130-1 when the operational status of CMCP client agent 205-1 is not normal (e.g., has stopped executing, reports an error, or provides some other exception). CMCP client agent 205-1 may be further configured to identify an event associated with client device 130-1, send notifications regarding the identified event to a network device, where the network device may be specified in the received parameters. CMCP client agent 205-1 may provide the notifications to the network device specified by the received parameters, and remotely accept commands to control the remote client device 130-1 by another network device.

Figure 7:
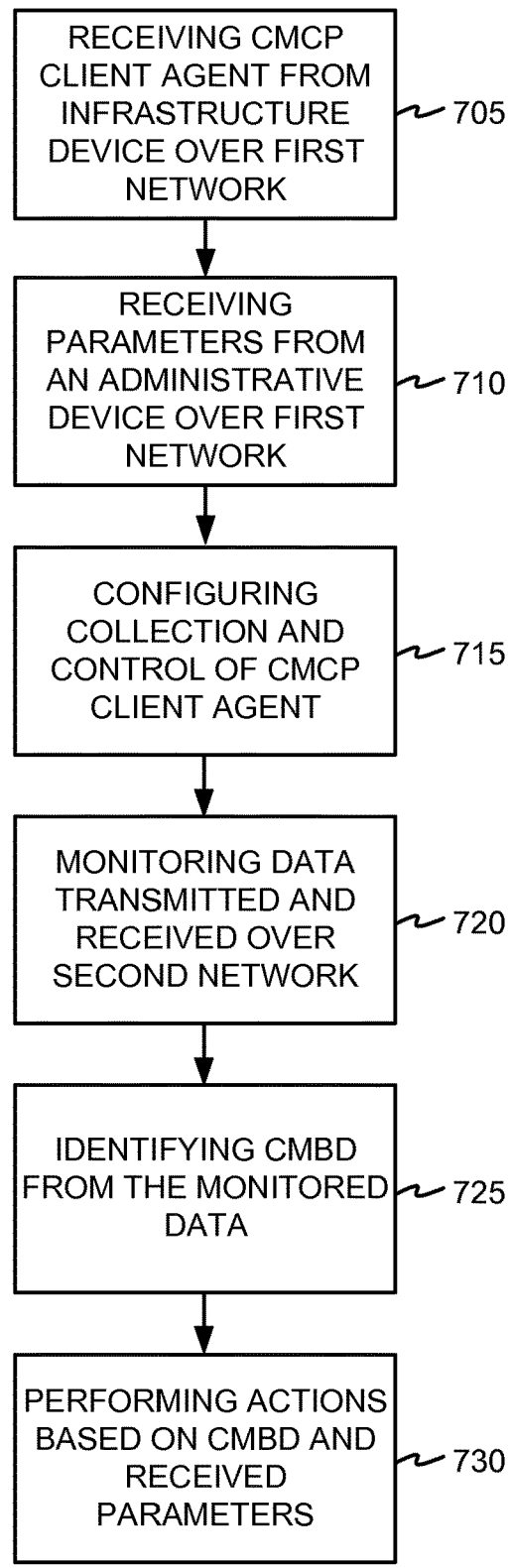
FIG. 7 is a flow chart showing an exemplary process for managing behavioral data of a client device which is exchanging data with a network other than the LAN.

FIG. 7 is a flow chart showing an exemplary process 700 for managing behavioral data of a client device which is exchanging data with a network other than LAN 105. Process 600 may execute on processor 515 in a client device (e.g., client device 130-1 as shown in FIG. 2B). Processor 515 may initially receive CMCP client agent software module 525 over LAN 105 from infrastructure device 135, based on the instruction commands by the administrator (705). Processor 515 may then receive parameters, including a policy (e.g., a master policy) from administrative device 140 over LAN 105 (710). Processor 515 may configure the collection and control for CMCP client agent 205-1 based on the received parameters (715). Once configured, client device 130-1 may disconnect and roam from LAN 105, and obtain a connection with a second network external to LAN 105 (e.g., WAN 110 as shown in FIG. 2B). Once connected to a second network processor 515 may monitor data transmitted to and received from the second network (720). Processor 515 may identify CMBD (e.g., information identifying purchases, rented movies, preferences such as "like" indications tied into social media sites, etc.) within the monitored data (725). Processor 515 may perform actions based on the identified CMBD data and the received parameters (730). The performed actions may include, for example, sending reports and/or notifications based on the CMBD to administrative device 140, third party network devices 125, and/or ISP network device(s) 127.

The foregoing description of implementations provides illustration and description, but is not intended to be exhaustive or to limit the invention to the precise form disclosed. Modifications and variations are possible in light of the above teachings or may be acquired from practice of the invention. For example, while series of messages and/or blocks have been described with regard to FIGS. 6 and 7, the order of the messages and/or blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:
1. A method, comprising:
sending, within a local area network (LAN), a setup utility from a wireless access device to an administrative device;
establishing, via the setup utility and by an administrator of the LAN, consent to monitoring and control of consumer managed behavioral data (CMBD) across a plurality of third party network destinations outside of the LAN, wherein the setup utility generates parameters for a CMBD monitoring and control platform (CMCP) of the wireless access device;
receiving, at the wireless access device from the administrative device directly over the LAN, the parameters for the CMCP, wherein the parameters define one or more conditions for a collection of the CMDB and a control of access to the CMDB, and wherein the one or more conditions include predetermined compensation;
configuring, based on the received parameters, the wireless access device for the collection of the CMDB and the control of access to the CMBD associated with at least one client device of the LAN;
monitoring, at the wireless access device and based on the configuring, data transmitted and received by the at least one client device via network access to one or more of the third party network destinations;
identifying, by the wireless access device, the CMBD from the monitored data based on the received parameters;

providing, by the wireless access device, access to the identified CMBD according to the one or more conditions defined in the received parameters;

providing, via the wireless access device and to a remote client device, a client agent which executes on the remote client device to monitor data transmitted and received by the remote client device over a second network external to the LAN, identify the CMBD from the monitored data, and generate a report based on the CMBD;

forwarding, by the wireless access device and based on the established consent, the report to at least one third party network device of the third party network destinations; and receiving, by the wireless access device and responsive to the report, the predetermined compensation.

2. The method of claim 1, wherein providing access comprises:

generating multiple reports based on the identified CMBD;

storing the reports on the wireless access device; and providing, according to the established consent, the reports to a network device based on the received parameters.

3. The method of claim 2, wherein generating multiple reports further comprises:

creating the reports, based on the received parameters and the identified CMBD, which indicate network usage based on at least one of a user designation, a device designation, an application designation, a connection type, connection quality, a content type, a traffic type, a protocol type, a network address, a time, a date, or a location associated with the at least one client device.

4. The method of claim 2, wherein providing the reports further comprises:

sending the reports to at least one of the administrative device or at least one third party network device at the plurality of third party network destinations based on the received parameters.

5. The method of claim 1, further comprising:

identifying an event associated with at least one client device; and sending notifications regarding the identified event to a network device, wherein the network device is specified in the received parameters.

6. The method of claim 5, wherein the identifying an event comprises:

determining, based on the received parameters, a state of monitoring associated with the at least one client device; and wherein the sending notifications further comprises:

sending a least one of an email, a text message, a mobile alert, or a social media announcement to the administrative device.

7. The method of claim 5, further comprising:

configuring the at least one client device for being controlled remotely by another network device based on the identified event.

8. The method of claim 1, wherein the receiving parameters from the administrative device further comprises:

receiving at least one of acknowledgment of terms and conditions for monitoring, identifying, and performing actions based on the CMBD, selection of the at least one client device, selection of a type of monitoring and identification of the CMBD, or a designation of a data threshold that is to be met to trigger the monitoring.

9. The method of claim 1, wherein identifying the CMBD from the monitored data further comprises:

determining the CMBD based on at least one of a user designation, a device designation, a connection type, connection quality, a traffic type, a protocol type, a network address, a time, a date, or a location associated with the at least one client device.

10. The method of claim 9, wherein identifying the CMBD further comprises determining data based on a domain identifier, a network header, a hypertext transfer protocol (HTTP) address, a uniform resource location (URL) identifier, a domain name server (DNS) identifier, an internet protocol address, a user identifier (UID), a media access controller (MAC) identifier, a wireless or wired connection type, or connection speed.

11. The method of claim 1, wherein the report is based on a selection of at least one of a user designation, a client device designation, an application type, a connection type, a connection quality, a content type, a traffic type, a protocol type, a network address, a time, a date, or a location associated with the at least one client device, and wherein the compensation comprises at least one of a discount or a credit from the at least one third party network device.

12. The method of claim 1, wherein the administrative device or the network device periodically checks the operational status of the client agent, and provides a notification or disables at least a portion of a functionality of the remote client device when the operational status of the client agent is not normal.

13. The method of claim 12, wherein the client agent is further configured to identify an event associated with the at least one client device, send notifications regarding the identified event to a network device, wherein the network device is specified in the received parameters, provide the notifications to the network device specified by the received parameters, and remotely accept commands to control the remote client device by another network device.

14. An infrastructure device, comprising:

an interface that communicates with a local network (LAN);

a memory configured to store instructions; and a processor, coupled to the interface and the memory, wherein the processor is configured to execute the instructions stored in the memory to:

send, within the LAN, a setup utility to an administrative device, establish, via the setup utility and by an administrator of the LAN, consent to monitoring and control of consumer managed behavioral data (CMBD) across a plurality of third party network destinations outside of the LAN, wherein the setup utility generates parameters for a CMBD monitoring and control platform (CMCP) of the infrastructure device, receive, over the LAN directly from the administrative device, the parameters for the CMCP, wherein the parameters define one or more conditions for a collection of the CMDB and a control of access to the CMDB, and wherein the one or more conditions include predetermined compensation, configure, based on the received parameters, the infrastructure device for the collection of the CMBD and the control of access to the CMBD associated with at least one client device of the LAN, monitor, based on the configuring, data transmitted and received by the at least one client device via network access to one or more of the third party network destinations, identify the CMBD from the monitored data based on the received parameters, provide access to the identified CMBD according to the one or more conditions defined in the received parameters, provide, to a remote client device, a client agent which executes on the remote client device to monitor data transmitted and received by the remote client device over a second network external to the LAN, identify the CMBD from the monitored data, and generate a report based on the CMBD;

forward, based on the established consent, the report to at least one third party network device of the third party network destinations; and receive, responsive to the report, the predetermined compensation.

15. The infrastructure device of claim 14, wherein the instructions to provide access comprise further instructions that cause the processor to:

generate multiple reports based on the identified CMBD, store the reports on the infrastructure device or on a network device over a wide area network, and provide, according to the established consent, the reports based on the received parameters.

16. The infrastructure device of claim 15, wherein the instructions to provide reports comprise further instructions that cause the processor to:

create the reports, based on the received parameters and the identified CMBD, which indicate network usage based on at least one of a user designation, a device designation, an application designation, a connection type, connection quality, a content type, a traffic type, a protocol type, a network address, a time, a date, or a location associated with the at least one client device.

17. The infrastructure device of claim 15, wherein the instructions to provide the reports comprise further instructions that cause the processor to:

send the reports to at least one of the administrative device or at least one third party network device at the plurality of third party network destinations based on the received parameters.

18. The infrastructure device of claim 14, further comprising instructions that cause the processor to:

identify an event associated with at least one client device, and send notifications regarding the identified event to a network device, wherein the network device is specified in the received parameters.

19. The infrastructure device of claim 18, wherein the instructions to identify an event comprise further instructions that cause the processor to:

determine, based on the received parameters, a state of monitoring associated with the at least one client device, and wherein the instructions to send notifications comprise further instructions that cause the processor to:

send a least one of an email, a text message, a mobile alert, or a social media announcement to the administrative device.

20. A non-transitory computer-readable medium comprising instructions, which, when executed by a processor, causes the processor to:

send, within a local area network (LAN), a setup utility from an infrastructure device to an administrative device;

establish, via the setup utility and by an administrator of the LAN, consent to monitoring and control of consumer managed behavioral data (CMBD) across a plurality of third party network destinations outside of the LAN, wherein the setup utility generates parameters for a CMBD monitoring and control platform (CMCP) of the infrastructure device, receive, at the infrastructure device from the administrative device directly over the LAN, the parameters for the CMCP, wherein the parameters define one or more conditions for a collection of the CMDB and a control of access to the CMDB, and wherein the one or more conditions include predetermined compensation;

configure, based on the received parameters, the infrastructure device for the collection of the CMDB and the control of access to the CMBD associated with at least one client device of the LAN;

monitor, at the infrastructure device and based on the configuring, data transmitted and received by the at least one client device via network access to one or more of the third party network destinations;

identify, by the infrastructure device, the CMBD from the monitored data based on the received parameters;

provide, by the infrastructure device, access to the identified CMBD according to the one or more conditions defined in the received parameters;

provide, via the infrastructure device and to a remote client device, a client agent which executes on the remote client device to monitor data transmitted and received by the remote client device over a second network external to the LAN, identify the CMBD from the monitored data, and generate a report based on the CMBD;

forward, via the infrastructure device and based on the established consent, the report to at least one third party network device of the third party network destinations; and receive, via the infrastructure device and responsive to the report, the predetermined compensation.

* * * * *